United States Patent Office 3,528,930
Patented Sept. 15, 1970

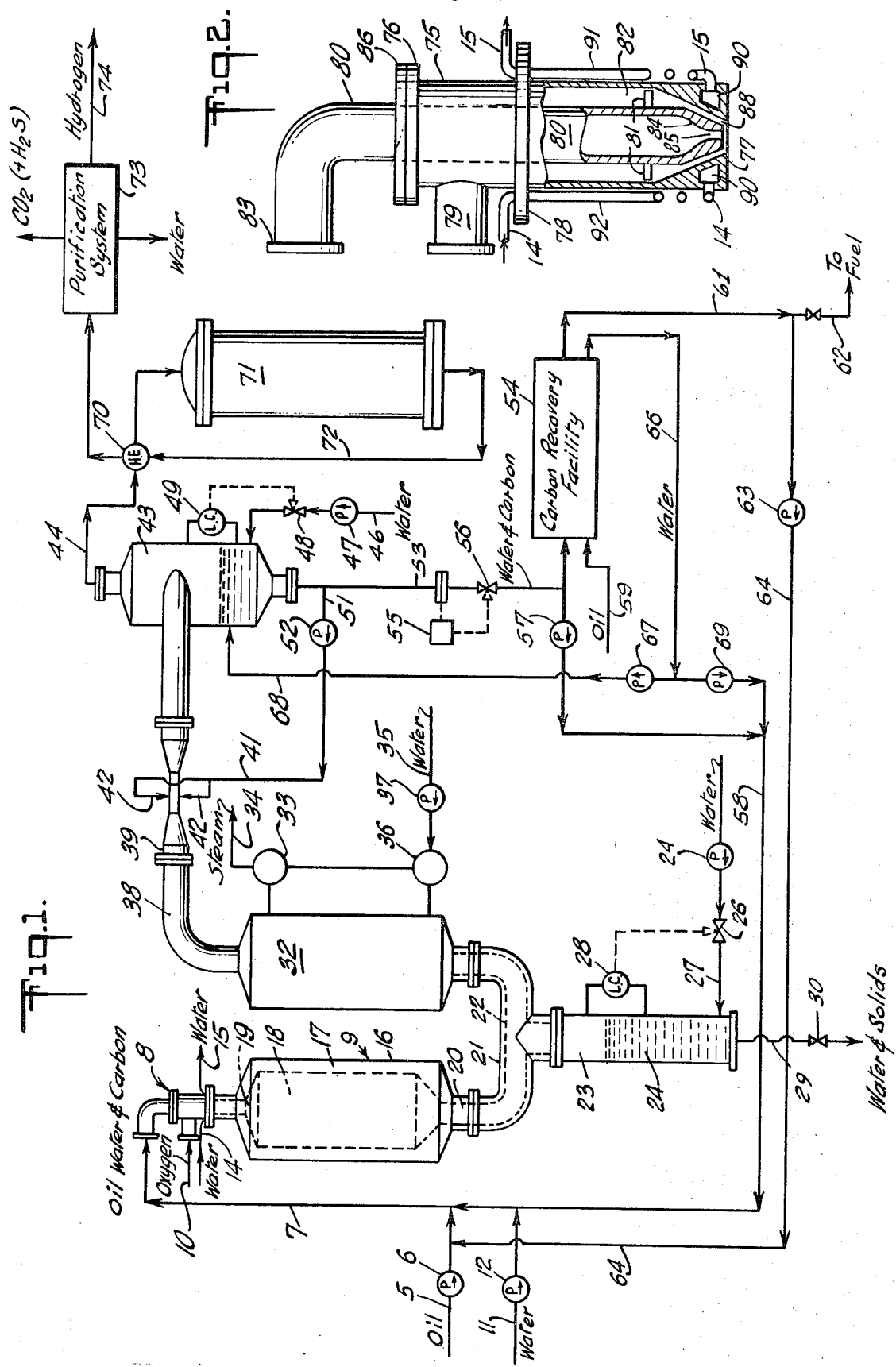

3,528,930
PRODUCTION OF SYNTHESIS GAS
Warren G. Schlinger, Pasadena, and William L. Slater and Roger M. Dille, La Habra, Calif., assignors to Texaco Inc., New York, N.Y., a corporation of Delaware
Continuation-in-part of application Ser. No. 510,038, Nov. 26, 1965, which is a continuation-in-part of application Ser. No. 285,868, June 6, 1963. This application May 29, 1968, Ser. No. 732,908
Int. Cl. C01b 2/14
U.S. Cl. 252—373     5 Claims

ABSTRACT OF THE DISCLOSURE

An improved process for generation of synthesis gas, i.e. carbon monoxide and hydrogen, by non-catalytic partial oxidation with oxygen in which oil is mixed with water and the mixture supplied, in liquid phase directly into a reaction zone in which reaction takes place with oxygen at an autogenous temperature above about 1800° F.

This application is a continuation-in-part of our copending U.S. patent application, Ser. No. 510,038, filed Nov. 26, 1965, now abandoned, which, in turn, is a continuation-in-part of our application, Ser. No. 285,868, filed June 6, 1963, and now abandoned.

This invention relates to the process for the production of carbon monoxide and hydrogen, or synthesis gas, from liquid hydrocarbons by direct partial oxidation with an oxygen-containing gas. In one of its more specific aspects, the present invention relates to a non-catalytic process for generating synthesis gas in which liquid water is supplied to the reaction zone as a temperature moderator. In another of its more specific aspects, the invention relates to the method of generating synthesis gas by direct partial oxidation wherein water is mixed with hydrocarbon oil and the mixture is charged to a reaction zone in liquid phase and reacted with oxygen at an autogenous temperature in the range of 1800° to 3200° F.

The generation of carbon monoxide and hydrogen, or synthesis gas, by non-catalytic reaction of hydrocarbons with oxygen or oxygen-enriched air, optionally in the presence of steam, is known. Partial oxidation of liquid hydrocarbons, especially heavy fuel oils, is a highly economical method of producing synthesis gas in quantity. In the partial oxidation process, liquid hydrocarbon is reacted with oxygen and steam in a closed, compact reaction zone in the absence of catalyst or packing at an autogeneous temperature within the range of about 1800 to 3200° F., preferably in the range of about 2200 to 2800° F. The hydrocarbon oil is usually partly or completely vaporized and mixed with or dispersed in steam. The hydrocarbon oil and steam are usually preheated to a temperature in the range of 500 to 800° F., generally to a temperature of at least 600° F., whereas oxygen usually is not preheated. The reaction zone is usually maintained at a pressure above about 100 pounds per square inch gauge, e.g., 600 to 1000 p.s.i.g.; recent trends are toward higher operating pressures up to about 2500 to 3000 p.s.i.g. The product gas stream consists primarily of carbon monoxide and hydrogen and contains relatively small amounts of carbon dioxide, methane and entrained carbon. Solid carbon produced in the process is liberated in very fine particle form which is easily wet by water.

The amount of oxygen supplied to the reaction zone is limited so that near maximum yields of carbon monoxide and hydrogen are obtained. Usually it is preferable to employ high purity oxygen, i.e., oxygen-rich gas streams containing in excess of 95 mol percent oxygen. Such oxygen concentrates are readily available from commercial oxygen plants.

Product gases issuing from the gas generation reaction zone contain a large quantity of heat. The heat may be employed advantageously to convert water to steam either by direct contacting of the hot gas stream with water or by passing the hot gas stream through a suitable heat exchanger, such as a waste heat boiler.

Generally it is desirable to operate the synthesis gas generator so that about two percent of the carbon contained in the hydrocarbon supplied to the gas generator is liberated as free carbon which is entrained in the product gas leaving the gas generator. Entrained carbon in the synthesis gas stream is effectively removed by contacting the gas stream with water in a suitable gas-liquid contact apparatus, for example a spray tower, bubble plate contactor, or packed column.

We have now discovered that improved results may be obtained by dispersing water in hydrocarbon oil feedstock and supplying the mixture in liquid phase directly to the reaction zone. The process of the present invention represents an improvement therefore over the conventional synthesis gas generation process as described hereinabove. Although various hydrocarbon liquids are suitable as feedstocks for the process, hydrocarbon oils having an API gravity less than 10° API are preferred. Heavy fuel oils which are suitable for use in the process include for example, heavy distillates, residual fuel oil, bunker fuel oil and No. 6 fuel oil. Preferably the hydrocarbon liquid feedstock has an initial boiling point above the boiling point of water, suitably above 250° F. The fuel oil may be preheated prior to mixing the oil with the water, but in any event the preheat should be limited to a temperature below the boiling point of water at the pressure under which mixing takes place.

The hydrocarbon oil feedstream which is mixed with water may comprise a slurry of carbon in oil. The water may comprise a slurry of carbon in water, e.g. a slurry obtained as a result of scrubbing product gases from the synthesis gas generator. The mixture of water and oil is substantially unvaporized prior to its introduction to the synthesis gas generator.

Advantages of the process as compared with conventional methods are many. For example, it is unnecessary to generate steam for the synthesis gas reaction, and it is possible to operate the synthesis gas generator with reduced amounts of water and at lower temperatures. Reduction of water in the feed to the process results in less steam, or water vapor, in the product gas stream. An advantage of the low content of steam in the product gas is realized when a waste heat boiler is used to cool the product gas and thereby generate steam. In such cases, the product gas stream is cooled only to a temperature above the dew point at the prevailing pressure to avoid condensation of water with resultant wetting and corrosion of heat exchanger surfaces and adhesion of carbon thereto.

FIG. 1 of the accompanying drawings is a diagrammatic elevational view of a suitable arrangement of apparatus by which a preferred embodiment of the process of this invention may be carried out.

FIG. 2 is a longitudinal view, partly in cross-section, of a burner structure suitable for use in the process of the present invention.

With reference to the drawings, hydrocarbon oil feedstock from a suitable source of supply, not illustrated, is fed through line 5 by pump 6 to line 7. In a preferred embodiment, water from a suitable supply source, e.g. line 11 and pump 12, is injected into the oil in line 7 forming a dispersion of water in oil which is supplied to burner 8 of synthesis gas generator 9. Oxygen from a suitable source of supply enters the burner 8 through line 10. The mixture or dispersion of water in oil from line 7 is discharged in liquid phase from burner 8 into gas generator 9 into admixture with oxygen from line 10. A suitable burner structure is illustrated in FIG. 2, described in detail hereinafter. Cooling water is supplied to the burner through line 14 and discharged through line 15 to prevent overheating of the burner tip.

Synthesis gas generator 9 comprises a cylindrical pressure vessel 16 with refractory lining 17 defining a cylindrical, compact, unpacked reaction chamber 18. A reaction mixture from burner 8 comprising oil, water and oxygen, is injected axially into the upper end of reaction chamber 18 through a suitable inlet passageway 19. Products of reaction are discharged axially from the lower end of reaction zone 18 through an outlet passageway 20 into transfer line 21 provided with a refractory lining 22.

In the reaction zone 18 of synthesis gas generator 9, the mixture of oil, water and oxygen reacts at an autogenous temperature above 1800° F., e.g., a temperature in the range of 2200 to 2800° F., producing synthesis gas comprising carbon monoxide and hydrogen and containing minor amounts of other gases and solid carbon.

The relative proportions of oil, water and oxygen are carefully regulated to convert substantially all of the carbon content of the hydrocarbon oil to carbon monoxide and to maintain an autogenous reaction zone temperature in the range of 1800 to 3000° F., preferably in the range of 2200 to 2800° F. Small amounts of free carbon, e.g. one to five percent of the carbon in the oil feed stream from line 7, is contained in the product gas. Also, small amounts of carbon dioxide, e.g., five to seven mol percent of the product gas, dry basis, appear in the synthesis gas product. Usually, from ninety to ninety-two percent of the carbon in the hydrocarbon feed stream is converted directly to carbon monoxide. At least a part of the carbon dioxide appearing in the product gas is the result of the water gas shift reaction. A small amount of methane, e.g., 0.2 to 0.4 mol percent, dry basis, is usually also present in the product gas stream. Some nitrogen and argon may also be included in the product gas, depending upon purity of the oxygen supplied to the process.

Any ash contained in the hydrocarbon oil, for example, ash liberated in the conversion of a heavy residuum to synthesis gas, is discharged from the lower part of reaction zone 9 as a molten ash or slag which is accumulated in slag chamber 23, dependent from transfer line 21. Molten ash from line 21 drops into a pool of water 24 maintained in slag accumulator 23 which effects quick cooling of the hot molten ash from the generator forming granular solid particles. Water is supplied to the slag accumulator 23 as required by pump 24 through a control valve 26 and line 27, suitably in response to a liquid level control 28. Accumulations of solid material, for example, carbon from the gas stream, scale, and solidified slag or ash from the fuel, may be withdrawn periodically from the lowermost portion of the slag accumulation zone 23 through line 29 controlled by valve 30.

Hot product gases leaving the gas generator through line 21 and substantially free from ash or slag from the fuel but still containing entrained carbon particles is passed upwardly through a waste heat boiler 32 wherein the gas stream is cooled to a temperature above its dew point, e.g., in the range of 450 to 600° F., generating high pressure steam which is delivered from steam drum 33 through line 34 for process use. Water for the waste heat boiler is supplied as required from line 35 to mud drum 36 by pump 37.

Cooled products from waste heat boiler 32 are passed through transfer line 38 to a gas-liquid contactor 39, into which water is injected from line 41 through injection nozzles 42 from a source described hereinafter. Intimate contact between product gas from line 38 and water from line 41 is effected in contactor 39, suitably a venturi contactor in which the gas stream is accelerated and water injected into the accelerated gas stream at the venturi throat from a plurality of nozzles 42, two of which are illustrated diagrammatically in the drawing; such contactors are known in the art.

The resulting mixture of gas and water formed in contactor 39 is directed into separator 43 wherein a separation is made between cooled, clean product gas and water containing carbon removed from the product gas stream. Separator 43 is suitably a cyclon-type vessel from upper end of which clean gas is discharged centrally and axially to line 44. Fresh water, suitably condensate from the process system, is introduced to separator 43 through line 46 by pump 47, suitably as controlled by a valve 48 responsive to a liquid level control 49. Water-containing carbon separated from the product gas stream accumulates in the lower portion of separator 43. A slurry of carbon in water is withdrawn from separator 43 through line 51. A part of the carbon-water slurry is recycled by pump 52 to line 41 and injection nozzles 42. The remainder of the carbon-water slurry is passed through line 53 to carbon recovery facility 54, suitably at a rate determined by a rate of flow controller 55 and control valve 56. If desired, water containing carbon may be passed by pump 57 through line 58 to line 7 as part or all of the water required for making up the oil and water charge to gas generator 9, with the remainder of the carbon-water slurry, if any, supplied to carbon recovery facility 54.

Carbon recovery facilities suitable for use in the process are known and are described in detail in U.S. Pats. 2,999,741 to R. M. Dille et al. and 2,992,906 to F. E. Guptill, Jr. Oil for the carbon recovery facilities, suitably a part or all of the oil required as feed for the synthesis gas generator, is supplied to the carbon recovery facility through line 59. In the carbon recovery facility, carbon is transferred from the water slurry or dispersion to the hydrocarbon oil thereby forming a carbon-oil slurry. Oil and carbon slurry is withdrawn from the carbon recovery facility through line 61 from which it may be passed through line 62 for use as fuel or passed by pump 63 through line 64 into line 7 where it may be employed as part or all of the oil required for the snythesis gas generation.

Clarified water is withdrawn from the carbon recovery facility 54 through line 66 from which it may be returned by pump 67 through line 68 to separator 43 or by pump 69 to line 58 and line 7 are part or all of the water required for preparation of feed for the synthesis gas generator.

Clean product gas from the synthesis gas generator discharged from separator 43 through line 44 is passed through heat exchangers 70 to a shift converter 71 containing a suitable shift conversion catalyst, e.g., iron oxide promoted with 5 to 15 weight percent chromic oxide as promoter. Heat exchanger 70 is an indirect gas-to-gas type heat exchanger. The net heat effect of the reactions taking place in shift converter 71 are exothermic. The shift converter 71 operates at a temperature in the range of 550 to 1000° F., preferably with outlet temperatures in the range of 650 to 750° F., and at substantially the same pressure as the gas generator 9 and waste heat boiler 32. Shifted synthesis gas, consisting essentially of carbon dioxide and hydrogen, is discharged from shift converter 71 through line 72 and passed through heat exchanger 70 to purification system 73. Heat exchanger 70 serves to preheat gas from separator 43 to the desired shift conversion reaction temperature. Purification system 73 effects removal of water and carbon dioxide (and hydrogen sulfide if present) from the shifted gas stream. Hydrogen is delivered through line 74 as product of the process.

A number of shift conversion catalysts are available commercially. Oxides and sulfides of iron, nickel, cobalt, molybdenum, zinc, copper and chromium are used in various catalysts, some of which employ various combinations of these materials. Preferred catalysts are those with iron oxide or iron sulfide as the major catalytic component with minor amounts of the oxide and sulfide and sulfides of nickel, zinc, and chromium.

For the production of hydrogen or mixtures of hydrogen and nitrogen suitable for the synthesis of ammonia, the product gas from the partial oxidation reaction is cooled, treated for removal of carbon, subjected to the water gas shift reaction, and purified by removal of carbon dioxide, water vapor or steam, hydrocarbons, argon, etc., to yield pure hydrogen or a mixture of hydrogen and nitrogen substantially free from other constituents. In the water gas shift reaction, gas from the synthesis gas generator, mixed with steam, is passed over a catalyst to effect reaction between carbon monoxide and steam to produce hydrogen and carbon dioxide. For the synthesis of ammonia, pure nitrogen obtained by liquefaction and rectification of air usually is added to the purified stream of hydrogen.

One method of removing most of the minor impurities from hydrogen, following removal of carbon dioxide and water, is by washing the hydrogen stream with substantially pure liquid nitrogen. Substantially pure nitrogen can be produced in the oxygen plant. Some of the liquid nitrogen is vaporized into the hydrogen to form the nitrogen-hydrogen mixture required for ammonia synthesis. At the same time, higher boiling constituents, e.g., argon, methane and carbon monoxide, are condensed and withdrawn with the unvaporized portion of the liquid nitrogen wash. Washing the hydrogen stream with liquid nitrogen produces a mixture of nitrogen and hydrogen, substantially free from other gases, especially advantageous for ammonia synthesis. The nitrogen wash is particularly suitable for use in the generation of ammonia synthesis feed gas by partial oxidation of hydrocarbons.

With reference to FIG. 2, a mixer-burner structure suitable for use as burner 8 of FIG. 1 for carrying out the method of this invention is shown in detail. This burner structure comprises a cylindrical steel conduit 75 provided with a flange 76 at one end and a water-cooled tip structure 77 at the other end. A mounting flange 78 intermediate the two ends of the cylindrical shell permits attachment of the burner to vessel 16 of FIG. 1. A flanged nozzle 79, intermediate flanges 76 and 78, provides an inlet for reactants to conduit 75.

A second tubular conduit 80 is contained within the outer conduit 75 and is uniformly spaced therefrom by guide spacers 81 to provide a uniform, annular passageway 82 between the two conduits. Inner conduit 80 has a flange 83 at one end, and a tip section 84 at the other having an axial outlet port or orifice 85. A mounting flange 86 intermediate the two ends of inner conduit 80 cooperates with flange 76 of outer conduit 75 to hold the conduits in fixed relation to one another. Suitably, the area of the outlet port 84 is one fourth to one half the free cross-sectional area of conduit 80. Tip portion 84 of conduit 80 is also tapered externally to provide a substantially uniform passageway or outer discharge port 86 between the outer surface of tip 83 and the inner surface of tip 77 for discharge of gaseous reactants from annular passageway 82. Conduits 75 and 80, comprising the basic elements of the burner, are axially aligned with one another and with the reaction chamber 10 for fast, uniform mixing of reactants and uniform reaction within the reaction chamber.

The burner tip structure 77 contains a passage 90 surrounding outer discharge port 88 for cooling the burner tip. Cooling water is supplied to passage 90 through line 14 circulated around the burner tip through passage 90 and discharged through line 15.

In operation, a mixture of liquid hydrocarbon from line 5 and water from line 11 is supplied through the interior of conduit 80 to tip 84 and discharged into reaction zone 16 through outlet port 85. At the same time, oxygen from line 12 is introduced through inlet 79 to annular passageway 82 and discharged through annular port 88 at high velocity relative to the velocity of the stream of water and oil discharged from port 85. The converging annular stream of gaseous reactants discharged from port 88 impinges upon the stream of liquid discharged through port 85 at high velocity with the result that the water and liquid hydrocarbon are intimately dispersed in the oxygen and form a homogenous reaction mixture substantially at the point of discharge of reactants from the burner into the reaction chamber 16. The mixture of reactants undergoes immediate reaction at reaction zone temperatures of 1800 to 3000° F. with the liberation of sufficient heat to maintain an autogenous temperature in the reaction zone in the range of 1800 to 3000° F.

The converging annular stream of oxygen is preferably discharged at relatively high velocity, for example a velocity above about 200 feet per second, suitably in the range of 200 to 400 feet per second, axially into reaction zone 18. The oil and water mixture supplied to the burner through line 7 is discharged centrally and axially into the converging stream of oxygen. Confluence of the streams with one another results in the formation of an intimate mixture of oxygen and highly dispersed droplets of water and hydrocarbon liquid. The velocity of the water and oil stream at the point of discharge into the stream of oxygen is preferably in the range of 5 to 40 feet per second. The relatively high velocity differential between the oxygen stream and the stream of water and liquid hydrocarbon results in efficient and highly effective atomization of the liquids.

EXAMPLES

Synthesis gas is generated by partial oxidation of hydrocarbon fuel oil admixed with water by non-catalytic reaction with pure oxygen in an unpacked reactor having an internal volume of 1.85 cubic feet. In the following examples, both the water and oil feed mixtures and the oxygen are supplied to the reaction zone at 250° F. The reported data are computer processed results based on operating data obtained from trial runs.

| Example No. | 1 | 2 | 3 | 4 |
| --- | --- | --- | --- | --- |
| Operating conditions: | | | | |
| Pressure, p.s.i.g. | 300 | 600 | 1,200 | 2,400 |
| Temperature, ° F. | 2,670 | 2,483 | 2,373 | 2,120 |
| Residence time, secs. | 1.37 | 2.17 | 3.01 | 4.11 |
| Feed rates: | | | | |
| Oxygen, s.c.f.h. | 4,538 | 5,770 | 8,375 | 12,824 |
| Oil, lbs./hr. | 336.9 | 442.65 | 656.36 | 1,082.3 |
| Water, lbs./hr. | 84.2 | 110.66 | 164.1 | 270.6 |
| Water/oil, lb./lb. | 0.25 | 0.25 | 0.25 | 0.25 |
| Oxygen/oil, s.c.f./lb. | 13.47 | 13.04 | 12.76 | 11.85 |
| Product rates: | | | | |
| Dry gas, moles/hr. | 42.49 | 56.52 | 84.04 | 137.17 |
| Carbon, wt. percent of C in feed | 2.0 | 2.0 | 2.0 | 2.0 |
| Product gas composition, mole percent: | | | | |
| Steam | 6.90 | 5.52 | 4.92 | 3.06 |
| Hydrogen | 39.62 | 40.95 | 413.6 | 41.61 |
| Carbon monoxide | 50.00 | 50.26 | 50.56 | 50.76 |
| Carbon dioxide | 2.91 | 2.66 | 2.37 | 2.29 |
| Nitrogen | 0.26 | 0.26 | 0.26 | 0.26 |
| Methane | 0.01 | 0.05 | 0.23 | 1.74 |
| Hydrogen sulfide | 0.28 | 0.28 | 0.28 | 0.29 |
| Carbonyl sulfide | 0.02 | 0.02 | 0.02 | 0.02 |
| $O_2/H_2+CO$ (s.c.f./M s.c.f.) | 292.8 | 278.7 | 271.6 | 258.7 |

We claim:

1. In a process for the generation of carbon monoxide and hydrogen by direct partial oxidation of hydrocarbon liquid wherein said hydrocarbon is subjected to reaction with free oxygen and steam at an autogenous temperature in the range of 1800 to 3000° F. in an unpacked reaction zone, the improvement which comprises introducing said hydrocarbon into said reaction zone in admixture with water in liquid phase in an amount sufficient to supply substantially all of said steam for said reaction into admixture with an oxygen-containing gas in relative proportions effecting substantially complete conversion of said hydrocarbon to carbon oxides and hydrogen and autogenously maintaining said temperature.

2. A method as defined in claim 1 wherein said reaction is carried out in the range of 100 to 3000 p.s.i.g.

3. A process as defined in claim 1 wherein said mixture of water and hydrocarbon liquid is a water in oil emulsion.

4. A process according to claim 1 wherein said oxygen-containing gas comprises at least 95 percent oxygen by volume.

5. A process according to claim 1 wherein said mixture of hydrocarbon liquid and water is preheated to a temperature below the vaporization temperature of water at the pressure existing within said gas generation zone prior to introduction of said mixture into said reaction zone.

References Cited

UNITED STATES PATENTS

| | | | |
|---|---|---|---|
| 2,059,536 | 11/1936 | Russell | 48—212 |
| 2,809,104 | 10/1957 | Strasser et al. | 48—215 |
| 3,010,813 | 11/1961 | Clarke et al. | 48—215 |

JOSEPH SCOVRONEK, Primary Examiner

U.S. Cl. X.R.

23—212, 213; 48—215; 252—374